(12) United States Patent
Murray et al.

(10) Patent No.: US 9,799,005 B2
(45) Date of Patent: Oct. 24, 2017

(54) COMPUTING SYSTEM WITH CONTEXTUAL INTERACTION MECHANISM AND METHOD OF OPERATION THEREOF

(71) Applicant: Samsung Electronics Co., Ltd., Gyeonggi-Do (KR)

(72) Inventors: Craig A. Murray, San Jose, CA (US); Michael Baisuck, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 477 days.

(21) Appl. No.: 13/789,349

(22) Filed: Mar. 7, 2013

(65) Prior Publication Data
US 2014/0259017 A1 Sep. 11, 2014

(51) Int. Cl.
 *G06F 9/50* (2006.01)
 *G06Q 10/10* (2012.01)

(52) U.S. Cl.
 CPC ........... *G06Q 10/10* (2013.01); *G06F 9/5038* (2013.01); *G06F 9/5055* (2013.01); *G06F 2209/508* (2013.01); *G06F 2209/545* (2013.01)

(58) Field of Classification Search
 CPC ................. G06F 9/5038; G06F 9/5055; G06F 2209/508; G06F 2209/545; G06Q 10/10
 See application file for complete search history.

(56) References Cited

U.S. PATENT DOCUMENTS

| | | | |
|---|---|---|---|
| 8,271,882 B2 | 9/2012 | Botscheck et al. | |
| 8,745,617 B1 * | 6/2014 | Stekkelpak | G06F 9/44505 717/173 |
| 2002/0191023 A1 * | 12/2002 | Chandhoke | G05B 19/0426 715/771 |
| 2003/0007007 A1 * | 1/2003 | Hinegardner et al. | 345/769 |
| 2003/0043199 A1 * | 3/2003 | Cooper | G06F 9/4443 715/804 |
| 2004/0194060 A1 * | 9/2004 | Ousterhout | G06F 8/41 717/120 |
| 2006/0041880 A1 * | 2/2006 | Martin | G06F 9/445 717/166 |

(Continued)

FOREIGN PATENT DOCUMENTS

| | | | | |
|---|---|---|---|---|
| CN | EP 2178279 A1 * | 4/2010 | | G06F 3/0482 |
| EP | 2386947 A1 | 11/2011 | | |

(Continued)

OTHER PUBLICATIONS

Liu et al., Study and Application of Distribution Automatic System in the Yangjiaping Power Supply Bureau, 2006 International Conference on Power System Technology.*

(Continued)

*Primary Examiner* — Lewis A Bullock, Jr.
*Assistant Examiner* — Tina Huynh
(74) *Attorney, Agent, or Firm* — IP Investment Law Group

(57) ABSTRACT

A method of operation of a computing system includes: determining a context for performing a user-initiated action; determining an operational order based on the context for performing the user-initiated action; and generating an application order based on the operational order for implementing an execution file and a further executable file according to the application order to perform the user-initiated action through displaying on a device.

14 Claims, 6 Drawing Sheets

(56) References Cited

U.S. PATENT DOCUMENTS

| | | | |
|---|---|---|---|
| 2006/0156252 A1* | 7/2006 | Sheshagiri | H04L 12/2803 715/825 |
| 2006/0156307 A1* | 7/2006 | Kunjithapatham | G06F 9/4843 718/103 |
| 2007/0022071 A1* | 1/2007 | Mullender et al. | 706/45 |
| 2007/0067373 A1* | 3/2007 | Higgins | G06F 11/3013 |
| 2007/0088583 A1* | 4/2007 | Chen | G06Q 10/06 705/7.27 |
| 2007/0124361 A1* | 5/2007 | Lowry et al. | 709/201 |
| 2007/0294512 A1* | 12/2007 | Crutchfield et al. | 712/200 |
| 2008/0222664 A1* | 9/2008 | Tsao | G06F 9/4428 719/328 |
| 2009/0006997 A1* | 1/2009 | Jiang | G06Q 10/00 715/771 |
| 2009/0172689 A1* | 7/2009 | Bobak | G06F 9/5061 718/104 |
| 2009/0228479 A1* | 9/2009 | Nishiyama | A63F 13/10 |
| 2010/0185630 A1 | 7/2010 | Cheng et al. | |
| 2011/0043652 A1 | 2/2011 | King et al. | |
| 2011/0145652 A1* | 6/2011 | Sukendro | G06F 9/4446 714/38.1 |
| 2012/0042036 A1* | 2/2012 | Lau | G06F 8/61 709/217 |
| 2012/0084292 A1 | 4/2012 | Liang et al. | |
| 2012/0115453 A1* | 5/2012 | Zheng | H04M 1/72569 455/418 |
| 2012/0117558 A1* | 5/2012 | Futty | G06F 9/44505 717/176 |
| 2012/0127082 A1* | 5/2012 | Kushler et al. | 345/169 |
| 2012/0290587 A1 | 11/2012 | Peyton et al. | |
| 2013/0159985 A1* | 6/2013 | Gilman | G06F 8/65 717/168 |
| 2013/0247030 A1* | 9/2013 | Kay | H04L 67/34 717/178 |

FOREIGN PATENT DOCUMENTS

| | | |
|---|---|---|
| KR | 1020080024114 A | 3/2008 |
| WO | 2005067418 A2 | 7/2005 |

OTHER PUBLICATIONS

John Whaley, Context-Sensitive Pointer Analysis Using Binary Decision Diagrams, Mar. 2007.*

Mashable.com, "Siri", http://mashable.com/category/siri/, Mar. 7, 2013.

European Patent Application No. 14760415.1, filed Jan. 28, 2014, European Search Report dated Sep. 13, 2016.

* cited by examiner

COMPUTING SYSTEM WITH CONTEXTUAL INTERACTION MECHANISM AND METHOD OF OPERATION THEREOF

TECHNICAL FIELD

The embodiment of the present invention relates generally to a computing system, and more particularly to a system for contextual user interaction.

BACKGROUND ART

Modern consumer and industrial electronics, especially devices such as graphical computing systems, televisions, cellular phones, portable digital assistants, and combination devices, are providing increasing levels of functionality to support modern life including access to user applications. Research and development in the existing technologies can take a myriad of different directions.

As users become more empowered with the growth of computing systems, new and old paradigms begin to take advantage of this new device space. One such advancement has been the use of software applications providing specific functions and user experience with the use of the computing systems.

However, the rapid growth of software applications has become a paramount concern for the consumer. The amount of available software applications and the various features therein has presented new challenges for the users.

Thus, a need still remains for a computing system with contextual user interaction mechanism to enhance the usability. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

The embodiment of the present invention provides a method of operation of a computing system including: determining a context for performing a task; determining an operational order based on the context for performing the task; and generating an application order based on the operational order for implementing an execution file and a further executable file according to the application order to perform the task through displaying on a device.

The embodiment of the present invention provides a method of operation of a computing system including: determining a user profile; determining a context based on the user profile with a control unit for performing a user-initiated action; determining an operational order based on the context for performing the user-initiated action; generating an application order based on the operational order for implementing an execution file and a further executable file according to the application order to perform the user-initiated action; and preloading the execution file, the further executable file or a combination thereof according to the application order for performing the user-initiated action and for displaying on a device.

The embodiment of the present invention provides a computing system, including: a context-determination module configured to determine a context for performing a task; an operation-ordering module, coupled to the context-determination module, configured to determine an operational order based on the context for performing the task; and an application-ordering module, coupled to the operation-ordering module, configured to generate an application order based on the operational order for implementing an execution file and a further executable file according to the application order to perform the task through displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
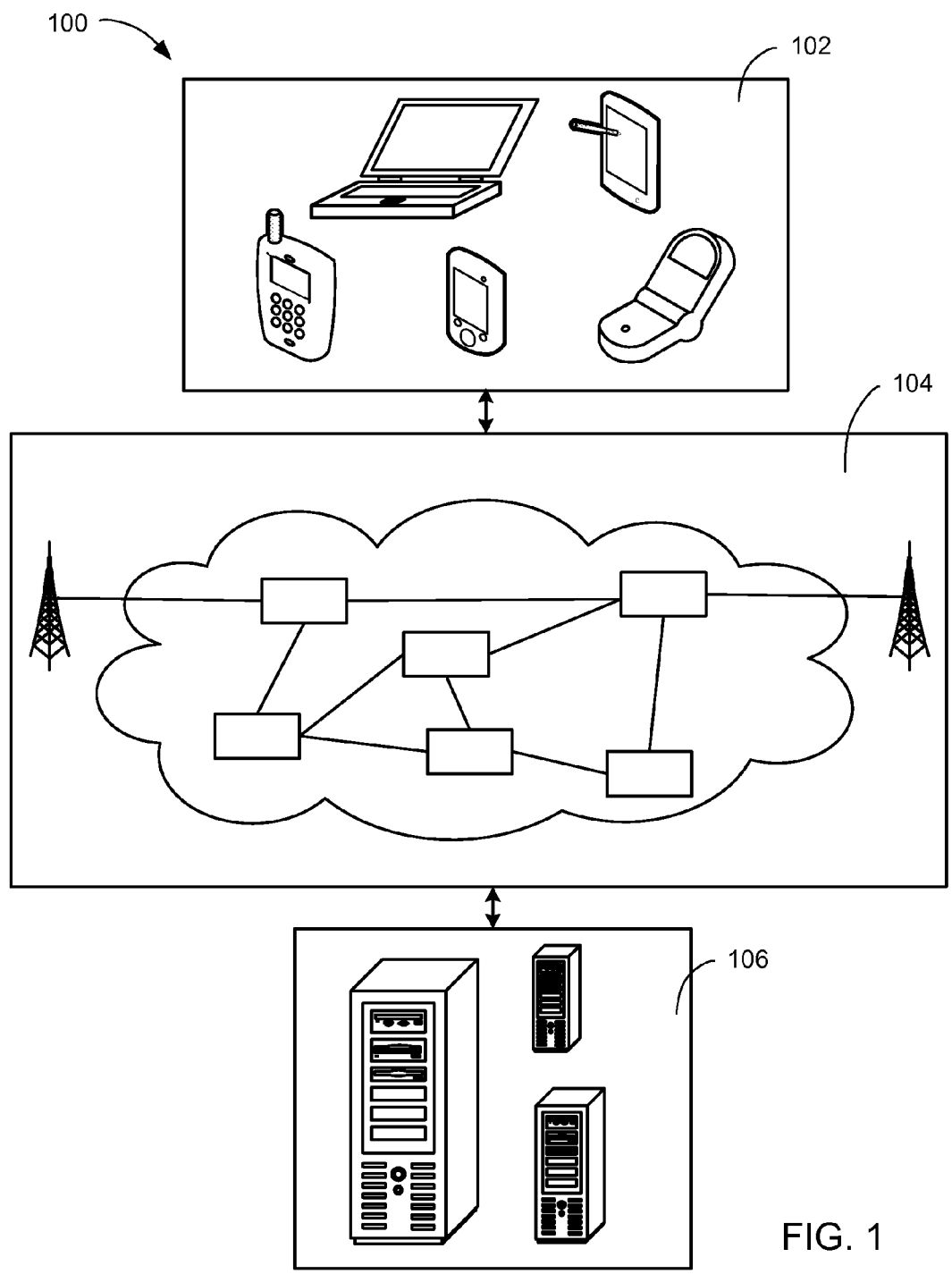
FIG. 1 is a computing system with contextual interaction mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the embodiment of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with contextual interaction mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a smart phone, a computer, or other multi-functional display or entertainment device. The first device 102 can couple, either directly or indirectly, to the communication path 104 to communicate with the second device 106 or can be a stand-alone device.

For illustrative purposes, the computing system 100 is described with the first device 102 as a display device, although it is understood that the first device 102 can be different types of devices. For example, the first device 102 can also be a device for presenting images or a multimedia presentation.

The second device 106 can be any of a variety of centralized or decentralized computing devices, or video transmission devices. For example, the second device 106 can be a server, a multimedia computer, a laptop computer, a desktop computer, grid-computing resources, a virtualized computer resource, cloud computing resource, routers, switches, peer-to-peer distributed computing devices, or a combination thereof.

In another example, the second device 106 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

The second device 106 can be centralized in a single room, distributed across different rooms, distributed across different geographical locations, embedded within a telecommunications network. The second device 106 can couple with the communication path 104 to communicate with the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train Also for illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
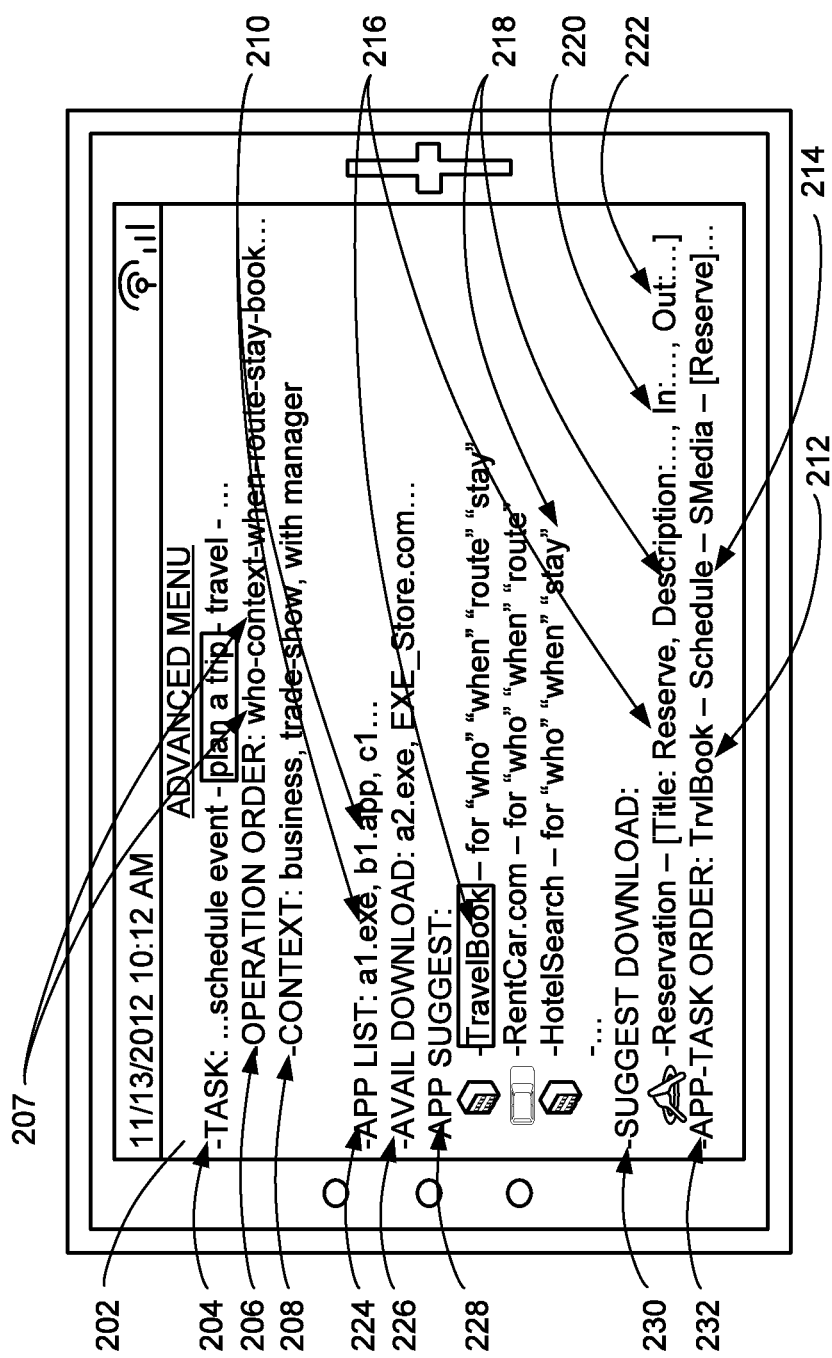
FIG. 2 is an example of a display interface of the first device of FIG. 1.

Referring now to FIG. 2, therein is shown an example of a display interface 202 of the first device 102 of FIG. 1. The display interface can show a user-initiated action 204. The user-initiated action 204 is defined as a function to be performed. The user-initiated action 204 can be an activity or a group of activities to be performed and completed by the computing system 100 of FIG. 1 for achieving an objective. For example, the user-initiated action 204 can be to plan a trip, create a document or an image, participate in entertainment related activities, search for information, communicate with other users or entities, organize a schedule or a calendar, reserve an item, location, or a service, or a combination thereof.

The user-initiated action 204 can have one or more actions related thereto for realizing or performing the user-initiated action 204. The user-initiated action 204 can have an operational order 206 for multiple actions. The operational order 206 is defined as a sequence for performing multiple actions. The operational order 206 can be an order of intermediate items 207 for realizing or performing the user-initiated action 204. The operational order 206 can organize the intermediate items 207 associated with the user-initiated action 204.

The intermediate items 207 are defined as steps, actions, goals or objectives, categories, or a combination thereof that can be used to perform various activities. The intermediate items 207 can be used to perform the user-initiated action 204. For example, the intermediate items 207 can be keywords, category identifiers, key verbs, or a combination thereof representing various independent steps, actions, goals or objectives, categories, or a combination thereof that can be combined to perform the user-initiated action 204.

For a more specific example, the intermediate items 207 can include "check for dates", "cross-check email and work schedule", "hotel reservation", "flight reservation", "conference registration", "verify confirmation information", or a combination thereof. The intermediate items 207 can be sequenced to perform the user-initiated action 204 of "organizing accommodations". Also for an example, the intermediate items 207 can be categorized and organized using keywords or concepts, such as "reservations", "accommodations", by basic information gathering concepts including "who", "when", "where", "what", and "how", or a combination thereof.

The operational order 206 for the task can depend on circumstances surrounding the user-initiated action 204. For example, the user-initiated action 204 of making reservations for a vacation can have a different instance of the operational order 206 than the user-initiated action 204 of making reservations for a business trip. The operational order 206 for a vacation can include looking up prices and locations, looking up personal calendar for available days, and comparing the two to find and reserve the flight and hotel for the economically available dates and locations. The operational order 206 can include searching for restaurant or activity recommendations from other users socially connected to the user or other users having similarities to the user in the computing system 100 in determining or refining the reservation dates.

Continuing with the example, the operational order 206 for a business trip can include booking the flight and hotel without looking up prices and locations or comparing them to schedule since the dates would be set. The operational order 206 can include searching for restaurant or activity recommendations based on information of the user, potential business contacts, such as a potential client or a potential contractor, co-attendees for the business trip, or a combination thereof after reserving the flight and hotel, instead of helping determine or refine the reservation dates.

The display interface 202 can show a context 208. The context 208 is defined as circumstances in which an event occurs. The context 208 can be related to the user-initiated action 204. For example, the context 208 can be a motivation, a reason, an influence, or a combination thereof for the user-initiated action 204.

The context 208 can be represented by a key word, a category, a functional limitation, such as enabling or disabling of features, a correlation between functions, such as a link between or preloading of features, a status, a value, or a combination thereof. The context 208 can be determined by the computing system 100. The context 208 can also be used to determine the operational order 206 for the user-initiated action 204. Details regarding the determination and the use of the context 208 will be discussed below.

The display interface 202 can also show applications 210, such as an execution file 212 and a further executable file 214. The applications 210 are defined as individual sets of instructions, each set for performing a specific action. The applications 210 can be used to realize or complete the user-initiated action 204 or a portion thereof. The applications 210 can be designed to help the user perform specific instances of the user-initiated action 204. The applications 210 can be software application or executable, a hardware accelerator, a hardware device, or a combination thereof.

The execution file 212 and the further executable file 214 can be different sets of instructions for performing different actions. The computing system 100 can use the execution file 212 and the further executable file 214 in a specific order to realize or complete the user-initiated action 204. Details regarding the ordering of the execution file 212 and the further executable file 214 will be described below.

The applications 210 can each have a title 216, a description 218, an input 220, and an output 222. The title 216 can be a set of letters, symbols, numbers, or a combination thereof of identifying individual instance the applications 210. The description 218 can be a set of letters, symbols, numbers, or a combination thereof detailing the specific actions that can be performed by each of the applications 210. For example, the description 218 can be a user description on a blog, a manufacturer description of the software, a set of keywords related to the specific action, or a combination thereof.

The input 220 can be the information used by each of the applications 210 to perform the specified actions. The output 222 can be the information produced, synthesized, displayed, accessed, or a combination of actions thereof by each of the applications 210.

The display interface 202 can show an application-set 224 and a download-set 226. The application-set 224 is defined as the applications 210 already available to the user on the first device 102, the second device 106 of FIG. 1, or a combination thereof. The application-set 224 can be a collection of the title 216, the description 218, address, pointer, or a combination thereof for the applications 210 stored on the first device 102, the second device 106, or a combination thereof. The application-set 224 can also be a collection of the applications 210 that the first device 102 can access immediately without requiring a purchase or a download of the applications 210 before using the applications 210.

The download-set 226 is defined as the applications 210 transferrable to the first device 102, the second device 106, or a combination thereof for use therein. The download-set 226 can be a collection of the title 216, the description 218, a source for downloading applications, or a combination thereof for the applications 210 that are not on the first device 102, the second device 106, or a combination thereof. The download-set 226 can be the applications 210 requiring an additional act for acquiring a right or an ability to use the applications 210, such as in purchasing or downloading the applications 210.

For example, the download-set 226 can be titles, descriptions, links, addresses, or a combination thereof for the applications 210 not on the first device 102, but can be transferred to the first device 102 from the second device 106, other external server, other external memory device, or a combination thereof. Also for example, the download-set 226 can be titles, descriptions, links, addresses, or a combination thereof for the applications 210 that are not on the first device 102 and not on the second device 106, but can be downloaded to the first device 102 or the second device 106 from other external server or other external memory.

The display interface 202 can also show an application suggestion 228 and a download suggestion 230. The application suggestion 228 can be an instance of the applications 210 available to the first device 102 that can be used to perform one or more actions for realizing or completing the user-initiated action 204. The application suggestion 228 can be the instance of the applications 210 already installed on the first device 102 or the second device 106. The application suggestion 228 can be represented by the title 216, the description 218, the address, the pointer to, or a combination thereof for the corresponding instance of the applications 210.

The download suggestion 230 can be an instance of the applications 210 not available to the first device 102 that can be downloaded to the first device 102 for performing one or more actions for realizing or completing the user-initiated action 204. The download suggestion 230 can be represented by the title 216, the description 218, link to, address of, or a combination thereof for the corresponding instance of the applications 210.

The display interface 202 can further show an application order 232. The application order 232 is defined as a sequence of execution of the applications 210 for realizing or completing the user-initiated action 204. The application order 232 can be an ordering of the applications 210 from the application-set 224, the download-set 226, the application suggestion 228, the download suggestion 230, or a combination thereof. The application order 232 can be based on the operational order 206. The determination and the use of the application order 232 will be discussed in detail below.

Figure 3:
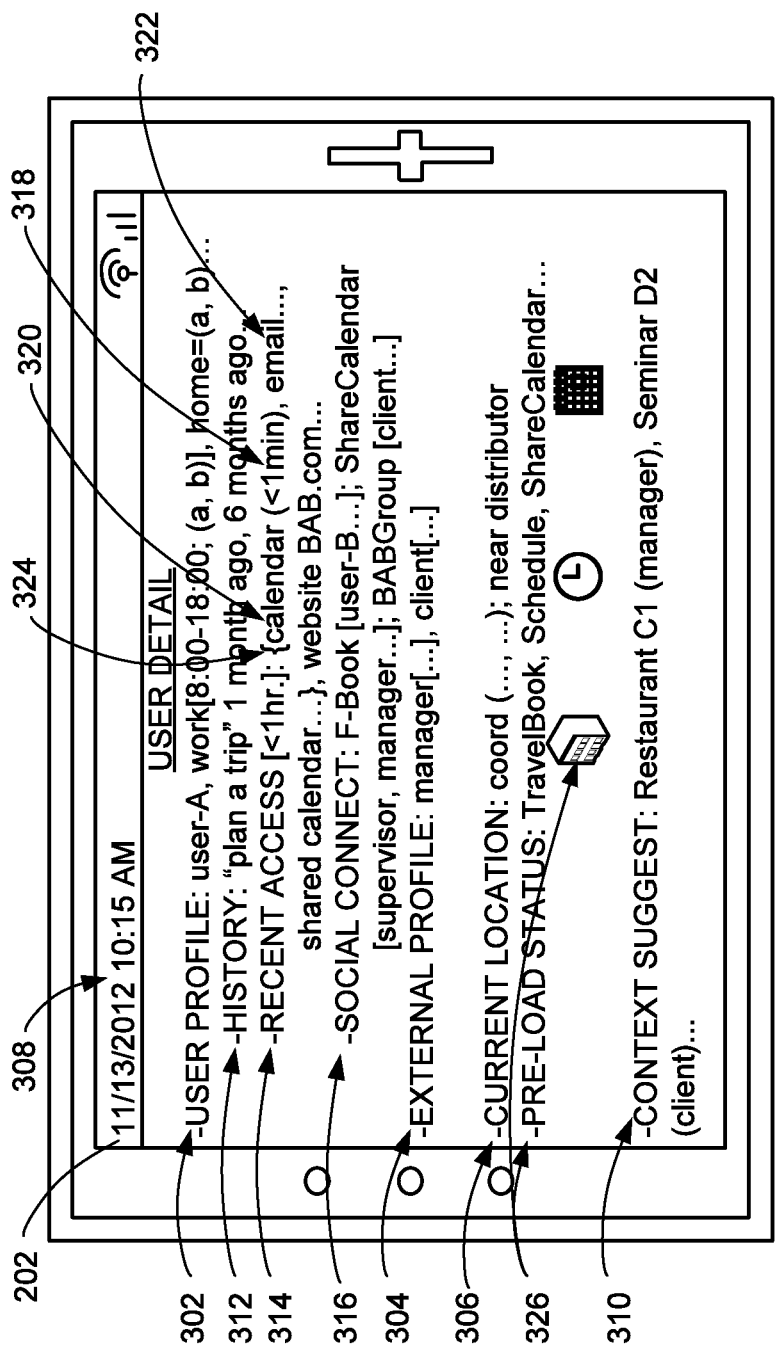
FIG. 3 is a second example of the display interface of the first device of FIG. 1.

Referring now to FIG. 3, therein is shown a second example of the display interface 202 of the first device 102 of FIG. 1. The display interface 202 can show a user profile 302, an external profile 304, a current location 306, a current time 308, and a context-based suggestion 310.

The user profile 302 is defined as a set of information describing the user in the context of the computing system 100 of FIG. 1. The user profile 302 can include personal information about the user, tasks or contexts associated with the user, accessible instances of the applications 210 of FIG. 2, the applications 210 the user has recently accessed, people or entities associated with the user, or a combination thereof.

The user profile 302 can have a usage history 312, a recent access set 314, a communication-set 316, or a combination thereof. The usage history 312 is defined as a record of user's access to the computing system 100. The usage history 312 can include instances of the user-initiated action 204 of FIG. 2, instances of the context 208 of FIG. 2, representations of the applications 210, instances of the application suggestion 228 of FIG. 2 or the download suggestion 230 of FIG. 2, or a combination thereof that the user has associated or accessed through the first device 102.

The recent access set 314 is defined as a record of the applications 210 that the user has accessed within a threshold duration 328. The recent access set 314 can be a record of the title 216 of FIG. 2, the description 218 of FIG. 2, link, address, pointer, or a combination thereof identifying the applications 210 accessed within the threshold duration 328.

The computing system 100 can track an elapsed-time 318 for each instance of the applications 210 on the first device 102. The elapsed-time 318 can be the duration of time since the user has accessed the corresponding instance of the applications 210. For example, the elapsed-time 318 can be the difference between the last user interface action, such as through a keyboard or a touch screen, and current time 308 or between when the instance of the applications 210 was closed or shutdown and the current time 308.

The computing system 100 can use the elapsed-time 318 to determine the recent access set 314. The computing system 100 can compare the elapsed-time 318 to the threshold duration 328, as determined by the computing system 100, software developer, hardware designer or manufacturer, or a combination thereof. The computing system 100 can determine the recent access set 314 to include or refer to the applications 210 having the elapsed-time 318 less than or equal to the threshold duration 328.

The user profile 302 can also have a basic-application set 324 identifying specific instances of the applications 210 that would be executed often by the first device 102. The basic-application set 324 can be instances of the applications 210 used to communicate, organize schedule, perform basic computing tasks, such as word processing, numerical calculation, data organization and access, or a combination thereof.

For example, the basic-application set 324 can include a schedule calendar 320, such as a personal or shared calendar or scheduling application, an electronic message interface 322, such as electronic mail application or webpage, short message service (SMS), multimedia messaging service (MMS), online messenger service, or a combination thereof. Also for example, the basic-application set 324 can include a word processing application, a spreadsheet application, a database application, a web browser, a search application, or a combination thereof.

The basic-application set 324 can represent the applications 210 that are important to the user or most often used by the user. The basic-application set 324 can be preselected by the computing system 100, the user, a software developer, a hardware manufacturer, or a combination thereof. The basic-application set 324 can also be selected or updated based on the frequency or the amount of usage.

The communication-set 316 is defined as instances of the applications 210 for interacting other devices. The communication-set 316 can include the applications 210 for interacting with other users. For example, the communication-set 316 can include social media applications or websites, shared calendars, or a combination thereof. The communication-set 316 can include the electronic message interface 322.

The external profile 304 is defined as a set of information regarding a person or an entity other than the user. The external profile 304 can be information that the other person or entity has composed to describe themselves. The external profile 304 can also be information that the first device 102, the second device 106, or a combination thereof has determined about the other person or entity.

For example, the external profile 304 can include information that the other person or entity has included on their social media medium or on a shared calendar. The external profile 304 can be accessed through the applications 210 in the communication-set 316. Also for example, the external profile 304 can include the recent access set 314 or the usage history 312 of the other person or entity, identification information, or a combination thereof.

The current location 306 can represent a physical location for the first device 102. The current location 306 can also represent a physical location of the user. The current location 306 can be an address, a set of coordinates, such as longitude and latitude or GPS coordinates, landmark information, cross-street, or a name of a point of interest, or a combination thereof. The current location 306 can also be contextual representation, such as workplace or home.

The current time 308 can be a representation of date, time, or both corresponding to the current instant. The current time 308 can include year, month, date, day of the week, hour, minute, second, or a combination thereof.

The context-based suggestion 310 is defined as an activity related to the context 208 that is not part of the user-initiated action 204. For example, the context-based suggestion 310 can be to have dinner with a client after the user-initiated action 204 of attending seminars. Also for example, the context-based suggestion 310 can be to buy food and drinks before the user-initiated action 204 of leaving for a road trip. For further example, the context-based suggestion 310 can be a separate and different instance of the user-initiated action 204 associated with the current instance of the user-initiated action 204 based on the context 208.

The computing system 100 can determine and suggest the context-based suggestion 310 using the context 208. The determination and use of the context-based suggestion 310 will be discussed in detail below.

The display interface 202 can also show a pre-loading status 326. The pre-loading status 326 is defined as an indication of progress for storing one or more of the applications 210 at an easily accessible location. The pre-loading status 326 can indicate progress for storing the one or more of the applications 210 at an easily accessible location within the first device 102. The pre-loading status 326 can be a symbol, a picture, a number, a letter, or a combination thereof indicating the status of steps before starting a user interface portion of the applications 210.

For example, the pre-loading status 326 can indicate use changes in a picture representing the one or more of the applications 210, such as in darkening the fill colors or appearing, to indicate a status or progress of pre-loading process. Also for example, the pre-loading status 326 can be represented by a bar filling up with colors, incrementing percentage, words, or a combination thereof.

The computing system 100 can pre-load the applications 210 by performing instructions corresponding to the applications 210 before the applications 210 start to interact with the user. The computing system 100 can also pre-load the applications 210 by storing instructions, input data, computational results, addresses, formats, or a combination thereof associated with the applications 210 from slower and more permanent memory to a faster or easily accessible memory. For example, the computing system 100 can transfer information from a hard drive or an external storage only device to random access memory, cache memory, pre cache memory, secure digital card, or a combination thereof.

Figure 4:
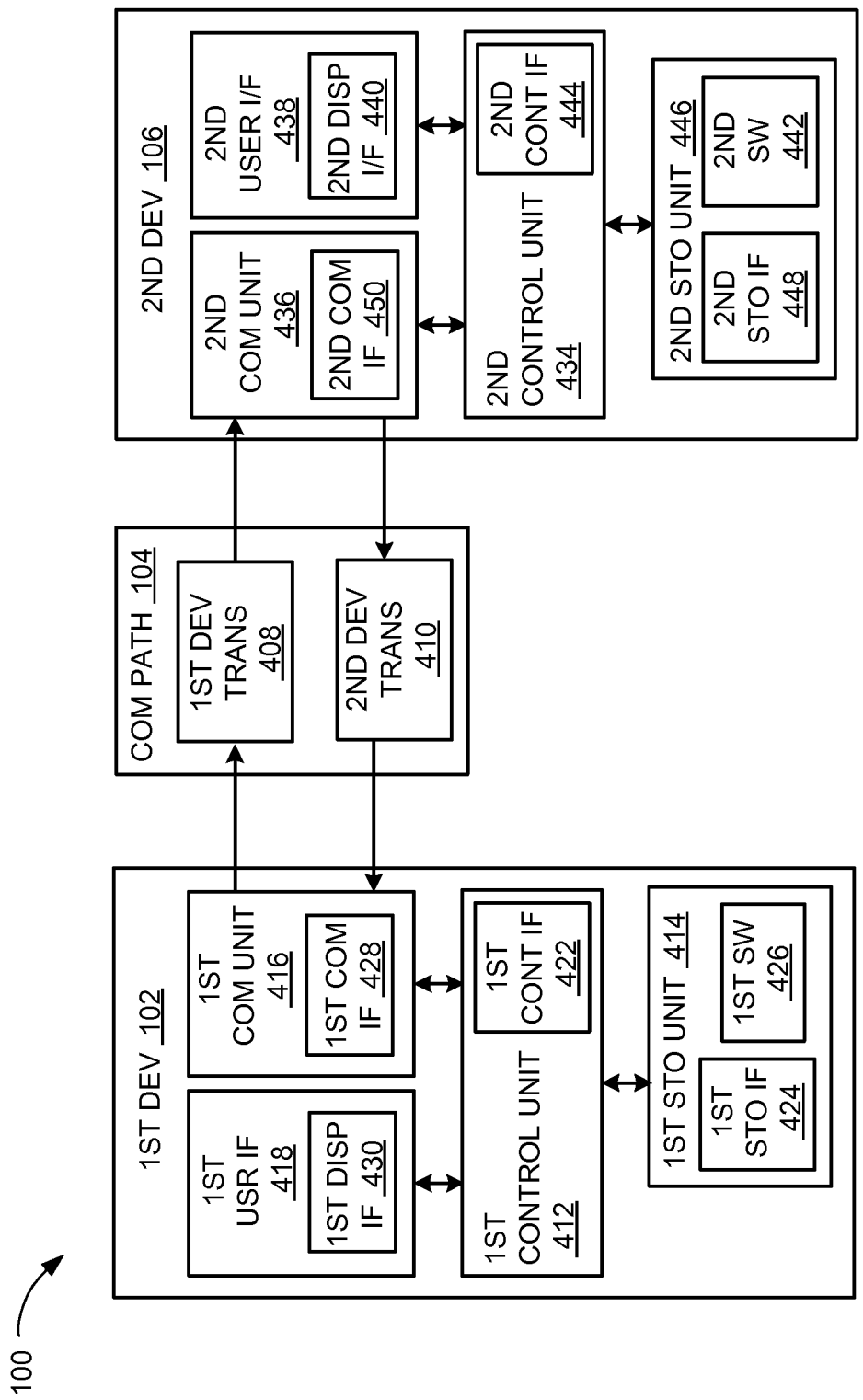
FIG. 4 is an exemplary block diagram of the computing system.

Referring now to FIG. 4, therein is shown an exemplary block diagram of the computing system 100. The computing system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the embodiment of the present invention.

The first device 102 can include a first control unit 412, a first storage unit 414, a first communication unit 416, and a first user interface 418. The first control unit 412 can include a first control interface 422. The first control unit 412 can execute a first software 426 to provide the intelligence of the computing system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as data representing incoming images, data representing previously presented image, sound files, or a combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the computing system 100. The first control unit 412 can also execute the first software 426 for the other functions of the computing system 100. The first control unit 412 can further execute the first software 426 for interaction with the communication path 104 via the first communication unit 416.

The second device 106 can be optimized for implementing the embodiment of the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the computing system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the computing system 100, including operating the second communication unit 436 to communicate with the first device 102 over the communication path 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the such as data representing incoming images, data representing previously presented image, sound files, or a combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the computing system 100 is shown with the second storage unit 446 as a single hierarchy storage system, although it is understood that the computing system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The computing system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100.

Figure 5:
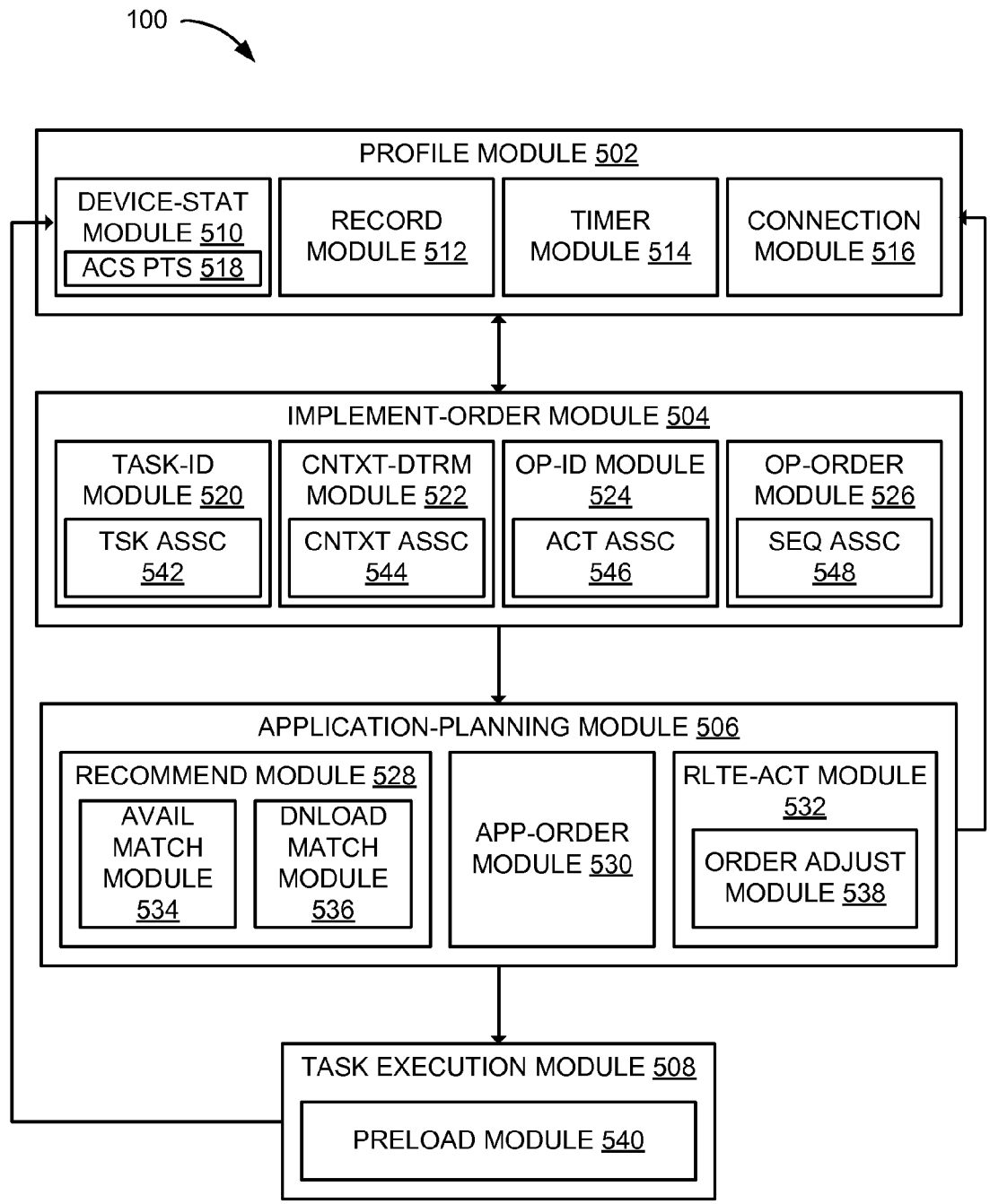
FIG. 5 is a control flow of the computing system.

Referring now to FIG. 5, therein is shown a control flow of the computing system 100. The computing system 100 can include a profile module 502, an implementation-order module 504, an application-planning module 506, and a task execution module 508.

The profile module 502 can be coupled to the implementation-order module 504. The implementation-order module 504 can be coupled to the application-planning module 506, and the application-planning module 506 can be further coupled to the task execution module 508.

The profile module 502 is configured to determine the user profile 302 of FIG. 3. The profile module 502 can determine the user profile 302 from interactions with the user through the first user interface 418 of FIG. 4, the second user interface 438 of FIG. 4, or a combination thereof. The profile module 502 can include a device-status module 510, a record module 512, a timer module 514, and a connection module 516 for determining the user profile 302.

The device-status module 510 is configured to identify the applications 210 of FIG. 2 accessible to the user on the first device 102 of FIG. 1, the second device 106 of FIG. 1, or a combination thereof. The device-status module 510 can identify applications 210 immediately accessible to the user, tools requiring a download before they can be accessed by the user, or a combination thereof. The device-status module 510 can determine the application-set 224 of FIG. 2, the download-set 226 of FIG. 2, or a combination thereof.

For example, the device-status module 510 can use the first control unit 412 of FIG. 4, the second control unit 434 of FIG. 4, or a combination thereof to identify the applications 210, such as the execution file 212 of FIG. 2 and the further executable file 214 of FIG. 2, already loaded on the first storage unit 414 of FIG. 4, the second storage unit of FIG. 4, or a combination thereof and readily accessible to the user. The device-status module 510 can set the title 216 of FIG. 2, the description 218 of FIG. 2, the address, pointer to, or a combination thereof for the applications 210 as the application-set 224.

Also for example, the device-status module 510 can use the first communication unit 416 of FIG. 4, the second communication unit 436 of FIG. 4, or a combination thereof to identify other instances of the applications 210 that are not readily accessible to the user. As a more specific example, the device-status module 510 can set the title 216, the description 218, download address, or a combination thereof for downloadable instances of the applications 210 not stored in the first device 102, not stored in the second device 106, or not stored on either.

The device-status module 510 can identify the basic-application set 324 of FIG. 3. The device-status module 510 can identify the basic-application set 324 by determining a number of use or access. The basic-application set 324 can include the applications 210 that have been accessed more than a predefined threshold.

For example, if the threshold is 14 accesses or uses within a week, the device-status module 510 can include the corresponding instance of the applications 210 in the basic-application set 324. The threshold duration and count can be predetermined by the computing system 100, the software developer, the hardware manufacturer or designer, or a combination thereof.

The device-status module 510 can also identify the basic-application set 324 by searching the application-set 224 for the instances having the title 216, a type, the description 218, or a combination thereof matching a predetermined list. The predetermined list can be predetermined by the computing system 100, the software developer, the hardware designer or manufacturer, or a combination thereof.

The device-status module 510 can further identify access points 518 for the applications 210 available to the user. The access points 518 are defined as specific instructions or steps within the applications 210 that are accessible by the user. For example, the access points 518 can be the pages, screens, functions, or a combination thereof within the applications 210 that can receive information from the user or requires user input before moving to the next instruction or step.

The device-status module 510 can identify access points 518 by identifying the user interface in the applications 210 that can receive user input. The device-status module 510 can identify the step, the relative time, the design, interaction from the user, or a combination thereof for user interface when the user accesses the applications 210. The device-status module 510 can also identify the user interface by receiving information regarding the step, the relative time, the design, interaction from the user, or a combination thereof for user interface, as predetermined by the computing system 100, the application developers, databases, instructional information, or a combination thereof.

The device-status module 510 can further track other peripheral information. The device-status module 510 can track the current location of FIG. 3, the current time 308 of FIG. 3, information received from the user, information presented to the user, or a combination thereof.

The device-status module 510 can be connected to the record module 512. For example, the output of the device-status module 510, such as the application-set 224, can be passed to the record module 512 as an input for the record module 512. Also for example, the device-status module 510 can store the outputs at a designated storage location that the record module 512 can access.

The record module 512 is configured to determine the usage history 312 of FIG. 3 and the recent access set 314 of FIG. 3. The record module 512 can determine the usage history 312 and the recent access set 314 by recording instances of the user-initiated action 204 of FIG. 2, the context 208 of FIG. 2, the application suggestion 228 of FIG. 2, the download suggestion 230 of FIG. 2, representations of the applications 210, or a combination thereof that the user has associated or accessed through the first device 102.

The record module 512 can use the application-set 224 from the device-status module 510 to determine the usage history 312 and the recent access set 314. The record module 512 can determine the usage history 312 and the recent access set 314 by listing all instances of the title 216 of the applications 210 in the application-set 224 for the usage history 312 and the recent access set 314, or a combination thereof.

The record module 512 can store information regarding associated or accessed instances of the user-initiated action 204, the context 208, the applications 210, the application suggestion 228, the download suggestion 230, or a combination thereof as the usage history 312. The record module 512 can further store information regarding associated or accessed instances of the applications 210 as the recent access set 314. The record module 512 can also store access information regarding only the basic-application set 324 in the recent access set 314.

The record module 512 can further store the time associated with each access or association for the usage history 312, the recent access set 314, or a combination thereof. The record module 512 can store time, date, or a combination thereof for when the user-initiated action 204, the context 208, the applications 210, the application suggestion 228, the download suggestion 230, or a combination thereof was associated or accessed.

The record module 512 and the timer module 514 can be connected. The record module 512 can have the output thereof connected to the input of the timer module 514. For example, the record module 512 can pass the usage history 312, the recent access set 314, or a combination thereof to the timer module 514. Also for example, the record module 512 can pass the address to the storage location of the usage history 312, the recent access set 314, or a combination thereof to the timer module 514.

The timer module 514 is configured to maintain the usage history 312, the recent access set 314, or a combination thereof. The timer module 514 can maintain the usage history 312 by deleting recorded instances within the usage history 312, the recent access set 314, or a combination thereof having the elapsed-time 318 of FIG. 3 exceeding the threshold duration 328 of FIG. 3.

The timer module 514 can calculate the elapsed-time 318 of FIG. 3 for instances in the usage history 312, the recent access set 314 or a combination thereof. The timer module 514 can calculate the elapsed-time 318 by calculating the difference between the time associated with each instances in the usage history 312, the recent access set 314, or a combination thereof and the current time 308.

The timer module 514 can compare the elapsed-time 318 to the threshold duration 328. The timer module 514 can delete recorded instances in the usage history 312, the recent access set 314, or a combination thereof when the elapsed-time 318 is greater than the threshold duration 328. The timer module 514 can delete the recorded instances by deleting the title 216, information regarding the time or identity of the applications 210 accessed by the first device 102, or a combination thereof from the usage history 312, the recent access set 314, or a combination thereof.

The connection module 516 is configured to identify relationships between the user and other people or entities. The connection module 516 can identify relationships by determining the communication-set 316 of FIG. 3.

The connection module 516 can determine the communication-set 316 by identifying instances of the external profile 304 of FIG. 3 connected to that of the user in social networking websites or applications. The connection module 516 can also determine the communication-set 316 by identifying communications of the user. For example, the connection module 516 can determine the communication-set 316 by identifying email addresses, phone numbers, mailing addresses, names or titles associated therewith, or a combination thereof used by the user for communication.

The connection module 516 can further determine the communication-set 316 to include the nature of the relationship the user has with each connection. The connection module 516 can determine the nature of the relationship using the external profile 304, communications with the user, user input, or a combination thereof.

For example, the connection module 516 can search for certain keywords in the external profile 304 or in the communications with the user and match the keywords found therein to a predetermined category, such as family, friend, coworker, supervisor, or a combination thereof. Also for example, the connection module 516 can determine the social relationship from the information found in the user's address book.

After determining the user profile 302, the control flow can proceed to the implementation-order module 504. The implementation-order module 504 is configured to identify a set of actions for realizing or performing tasks.

The implementation-order module 504 can include a task-identification module 520, a context-determination module 522, an operation-identification module 524, and an operation-ordering module 526. The task-identification module 520 is configured to determine the user-initiated action 204.

The task-identification module 520 can determine the user-initiated action 204 based on the user profile 302. The task-identification module 520 can determine the user-initiated action 204 from information in the basic-application set 324, the recent access set 314, the usage history 312, updates in the external profile 304, or a combination thereof. For example, the task-identification module 520 can determine the user-initiated action 204 from scheduled events in the schedule calendar 320 of FIG. 3, keywords used in communication application, the list of applications accessed within a predetermined amount of time, status updates or updated information on friends' social network pages, or a combination thereof.

The task-identification module 520 can determine the user-initiated action 204 by determining one or more activities required for other activities or objectives found in the user profile 302. The task-identification module 520 can determine the user-initiated action 204 by matching user inputs found in the user profile 302 to a task-association 542. The task-association 542 is defined as a group of concepts or rules for determining the user-initiated action 204.

The task-association 542 can have groupings of keywords for representing concepts. For example, the task-association 542 can have each instances of possible tasks, such as "reserving accommodations" or "shopping", have group of keywords associated, such as "hotel", "airplane", "travel", "business", "vacation", "trip", or a combination thereof for "reserving accommodations" or "clothes", "buy", "sale", "clearance", "purchase", or a combination thereof for "shopping".

The task-association 542 can also have rules for determining the user-initiated action 204. For example, the task-association 542 can have dates, locations, keywords, or a combination thereof always or never indicate an instance of the user-initiated action 204. Also for example, the task-association 542 can have a rule for determining the user-initiated action 204 from a certain subset of the task-association 542 based on other conditions, such as dates, locations, keywords, recently used application, or a combination thereof.

The task-association 542 can further have scores or probabilities associated with the concepts, the rules, or a combination thereof. For example, the task-association 542 can have an arbitrary score or probability increase associated with "business trip" for representing a likelihood that the user is trying to "make reservations".

The task-identification module 520 can sum the scores or calculate the overall probability based on matching keywords or applicable rules. The task-identification module 520 determine the user-initiated action 204 as the category or the instance having the highest score or probability, have a combined score or probability above a threshold, or a combination thereof.

The task-identification module 520 can determine the user-initiated action 204 by comparing the user input, the user profile 302, or a combination thereof to the task-association 542. The task-identification module 520 can determine the user-initiated action 204 as the category or instance having keywords, in agreement with the rules, or a combination thereof for the user input, the user profile 302, or a combination thereof.

For example, the task-identification module 520 can identify a "trade show" on the schedule calendar 320 occurring more than 50 miles away, and within a week. The task-identification module 520 can determine the user-initiated action 204 as "make reservations" required for attending the "trade show" based on matching "trade show", using rules for distance and relative timing, or a combination thereof for category of "make reservations" in the task-association 542.

Also for example, the task-identification module 520 can identify that the user has performed repeated searches for the same product. The task-identification module 520 can compare the searched item, the websites or applications the user accesses to search for the product, or both in the task-association 542. The task-identification module 520 can determine "shopping", "internet shopping", "search", or a combination thereof as the user-initiated action 204 based on matching keywords or applicable rules in the task-association 542 corresponding to the searched item, the websites or applications, or a combination thereof.

The task-identification module 520 can be implemented through the first user interface 418 to naturally interact with the user to identify the user-initiated action 204. The task-identification module 520 can communicate with the user audibly through speakers and microphones, visibly through screens and user selection methods, or a combination thereof. The task-identification module 520 can be implemented to recognize user's natural speech pattern. The task-identification module 520 can be implemented to identify keywords in the user's natural speech that correspond to commands and input information for the first device 102.

The task-identification module 520 can be connected to the context-determination module 522. The task-identification module 520 can pass a flag to the context-determination module 522 after identifying the user-initiated action 204. The user-initiated action 204 can be a basis for operating the context-determination module 522. The task-identification module 520 can also pass the output thereof as an input to the context-determination module 522.

The context-determination module 522 is configured to determine the context 208 for the user's interaction with the first device 102 to perform the user-initiated action 204. The context-determination module 522 can determine the context 208 for performing the user-initiated action 204 by identifying the information associated with the determination of the user-initiated action 204.

The context-determination module 522 can determine the context 208 based on the user profile 302 and using processes similar to the task-identification module 520. The context-determination module 522 can determine the context 208 by comparing the user profile 302 or user input to a context-association 544.

The context-association 544 is defined as a group of concepts or rules for determining the context 208. The context-association 544 can include groupings of keywords for representing concepts, rules for comparing concepts, such as controlling the searchable field or conditions for determining matches, or a combination thereof.

For example, the context-determination module 522 can determine the context 208 by matching the user input, the user profile 302, or a combination thereof to keywords, rules, other tasks or contexts, or a combination thereof in the context-association 544 as described above for task-identification module 520. Also for example, the context-determination module 522 can use scores or probabilities to determine the context 208 as described above for task-identification module 520.

For a more specific example, the context-determination module 522 can determine the context 208 to include "personal", "vacation", and "group" when the user receives messages with keyword "vacation" from "friends" as identified in the communication-set 316 and the user-initiated action 204 is to "make reservations". For a further specific example, the context-determination module 522 can determine the context 208 to include the name of the television show the user is viewing when the user-initiated action 204 is to search for information.

The context-determination module 522 can further use the current location 306, the current time 308, the schedule calendar 320, the electronic message interface 322 of FIG. 3, or a combination thereof to determine the context 208. For example, the current location 306 and the current time 308 can be used to determine if the first device 102 is at work. Also for example, the schedule calendar 320 and the electronic message interface 322 can determine the context 208 of business trip based on the scheduled appointments or communicated emails regarding the details of the business trip.

The context-determination module 522 can be connected to the operation-identification module 524. The context-determination module 522 can output the user-initiated action 204 and the context 208 into the input of the operation-identification module 524.

The operation-identification module 524 is configured to determine the intermediate items 207 of FIG. 2 for completing the user-initiated action 204. The operation-identification module 524 can have an activity-association 546 having related words associated with the intermediate items 207.

The activity-association 546 is defined as group of concepts or rules for determining a group of the intermediate items 207 for completing the user-initiated action 204. The activity-association 546 can have various keywords or identifiers representing activities or steps, keywords, rules, or a combination thereof corresponding to the user-initiated action 204, the context 208, or a combination thereof.

The operation-identification module 524 can be similar to the context-determination module 522 and the task-identification module 520. The operation-identification module 524 can determine the intermediate items 207 for the user-initiated action 204 using the first control unit 412, the second control unit 434, or a combination thereof to identify the intermediate items 207 having keywords or categories associated with the keywords of the user-initiated action 204.

For example, the first storage unit 414, the second storage unit 446, or a combination thereof can have "reservation", "dates", "location", and "price" associated with each other in the activity-association 546. For the user-initiated action 204 of making reservations, the operation-identification module 524 can determine the required in stances of the intermediate items 207 as determining the dates, location, and the price for making the reservations.

The operation-identification module 524 can also have set of the intermediate items 207 directly associated with different instances of the user-initiated action 204 or categories of the user-initiated action 204. The operation-identification module 524 can determine the intermediate items 207 for completing the user-initiated action 204 by identifying the set of activities or steps directly associated with the current instance of the user-initiated action 204. The operation identification module 524 can identify the intermediate items 207 by identifying the activities or steps corresponding to the user-initiated action 204, the context 208, or a combination thereof in the activity-association 546.

The operation-identification module 524 can be connected to the operation-ordering module 526. For example, the determined instances of the intermediate items 207 for completing the user-initiated action 204 can be passed to the operation-ordering module 526 as inputs thereof. Also for example, the determined activities or steps can be stored in the first storage unit 414, the second storage unit 446, or a combination thereof at a designated location accessible to the operation-ordering module 526.

The operation-ordering module 526 is configured to determine a logical sequence of the intermediate items 207. The operation-ordering module 526 can determine the logical sequence by determining the operational order 206 of FIG. 2 for the user-initiated action 204 for sequencing the intermediate items 207 to perform the user-initiated action 204.

The operation-ordering module 526 can have a sequencing-association 548 for determining the operational order 206. The sequencing-association 548 is defined as a group of concepts or rules for determining the operational order 206. The sequencing-association 548 can be a group of rules, guidelines, logic, identifiers, keywords, sequences, scores, probabilities, or a combination thereof.

The operation-ordering module 526 can determine the operational order 206 by assigning a sequential order for the intermediate items 207 determined by the operation-identification module 524. The operation-ordering module 526 can follow rules or guidelines in the sequencing-association 548 to assign the sequential order.

For example, the first storage unit 414, the second storage unit 446, or a combination thereof can have a set of rules or guidelines in the sequencing-association 548 for determining priorities between different objectives or categories. For certain instances, "when" and "where" can have higher priority than "how" and "cost". In other instances, "cost" can have higher priority than "when", "where", and "stay".

The in the sequencing-association 548 can be based on the context 208. The rules or guidelines can be organized based on the context 208 or based on both the context 208 and the user-initiated action 204.

For example, for the user-initiated action 204 of making reservations, the context 208 of business trip can prioritize "when" and "where" and have determining the date and location over "cost" for determining the price, since business trips tend to have contextual basis requiring set dates, such as a trade conference or a meeting with a client. In contrast, the context 208 of personal vacation can prioritize "cost" for determining the price over "when" and "where" for determining the date and location, since personal vacations tend to be more flexible with dates and location.

The operation-ordering module 526 can set the rules or priorities in the sequencing-association 548 corresponding to the user-initiated action 204, the context 208, or a combination thereof as the operational order 206. The operation-ordering module 526 can also determine the operational order 206 as the sequence for the intermediate items 207 based on the associated categories or keywords. Continuing with the example, the step of determining location can come before determining the date, which can come before cost considerations when the context 208 is a business trip.

The operation-ordering module 526 can also use a scoring system for determining the operational order 206. The operation-ordering module 526 can give different scores to the intermediate items 207 associated with the user-initiated action 204 according to the sequencing-association 548 and based on the context 208. The operation-ordering module 526 can sequence the intermediate items 207 in an ascending or descending order of the associated scores.

It has been discovered that the context 208 and the operational order 206 provides improved efficiency and accuracy for the computing system 100. The context 208 and the operational order 206 provides improved efficiency and accuracy by allowing surrounding circumstances to adjust the order of the intermediate items 207. The context 208 based sequencing reflected in the operational order 206 can eliminate repeated steps and reduce user interactions to complete the user-initiated action 204. Furthermore, the reduction of user interactions can reduce potentials for user error.

The user-initiated action 204 and the context 208 can be passed back to the profile module 502, which can update the usage history 312 to include the determined instances of the user-initiated action 204 and the context 208. After determining the operational order 206 according to the user-initiated action 204 and the context 208, the control flow can pass to the application-planning module 506.

The application-planning module 506 is configured to organize the applications 210 to realize or complete the user-initiated action 204. The application-planning module 506 can determine the instances of the applications 210 and the sequence thereof for performing the user-initiated action 204 through the first device 102.

The application-planning module 506 can have a recommendation module 528, an application-ordering module 530, and a related-activity module 532 for determining the particular instances of the applications 210 and the sequence thereof. The recommendation module 528 can further have an available match module 534 and a download match module 536, and the related-activity module 532 can further have an order adjustment module 538.

The recommendation module 528 is configured to determine the particular instances of the applications 210 for performing the user-initiated action 204. The recommendation module 528 can determine the instances of the applications 210 for performing one or more of the intermediate items 207 associated with completing the user-initiated action 204. The recommendation module 528 can determine the application suggestion 228, the download suggestion 230, or a combination thereof.

The available match module 534 is configured to determine the application suggestion 228. The available match module 534 can compare the individual activities or operations of the user-initiated action 204 identified in the operational order 206 to the application-set 224. The available match module 534 can determine the instance of the applications 210 matching one or more of the individual activities or operations of the user-initiated action 204 as the application suggestion 228.

The available match module 534 can perform a categorical or keyword matching to determine the application suggestion 228. The available match module 534 can compare the title 216, the description 218, or a combination thereof for the applications 210 in the application-set 224 to the categories or keywords associated with the individual activities or operations of the user-initiated action 204. The available match module 534 can set the title 216, address of, link to, or a combination thereof for the applications 210, such as the execution file 212 or the further executable file 214, matching the individual activities or operations of the user-initiated action 204 as the application suggestion 228.

The available match module 534 can also determine the application suggestion 228 by scoring or ranking the applications 210 for each of the intermediate items 207 identified in the operational order 206. The scoring or ranking for the applications 210 can be based on the number of instances of the intermediate items 207 in the operational order 206 that the instance of the applications 210 can perform according to the description 218, a weight or importance for instances of the intermediate items 207, a relative order the intermediate items 207 in the operational order 206, or a combination thereof. The available match module 534 can use results of matching to determine the scoring or ranking.

The available match module 534 can also use usage behavior from the user profile 302 to determine the application suggestion 228. The available match module 534 can search the usage history 312, the recent access set 314, or a combination thereof to determine the specific instance of the applications 210 the user used for similar instances of the context 208, the user-initiated action 204, the individual instances of the intermediate items 207 associated therewith, or a combination thereof.

The available match module 534 can increase the scoring or ranking for the previously used instances of the applications 210. The available match module 534 can also determine the previously accessed instances of the applications 210 as the application suggestion 228.

The download match module 536 is configured to determine the download suggestion 230. The download match module 536 can compare the individual activities or operations of the user-initiated action 204 identified in the operational order to the download-set 226. The download match module 536 can determine the instance of the applications 210 matching one or more of the individual activities or operations of the user-initiated action 204 as the download suggestion 230.

The download match module 536 can determine the download suggestion 230 similar to the operations of the available match module 534. For example, the download match module 536 can perform categorical or keyword matching, score or rank the applications 210, or a combination thereof using the individual activities or operations of the user-initiated action 204, the download-set 226, the usage history 312, the recent access set 314, or a combination thereof.

The available match module 534 and the download match module 536 can pass the application suggestion 228 and the download suggestion 230, respectively, when one instance of the applications 210 performs one or more of the individual activities or operations of the user-initiated action 204. The available match module 534 and the download match module 536 can pass the applications 210 having the highest score or ranking as the application suggestion 228 or the download suggestion 230 when more than one instance of the applications 210 satisfies one or more of the individual activities or operations of the user-initiated action 204.

The available match module 534 and the download match module 536 can identify all instances of the applications 210 performing the individual activities or operations of the user-initiated action 204 and their associated scores or ranking. The recommendation module 528 can determine the application suggestion 228, the download suggestion 230, or a combination thereof for the application order 232 of FIG. 2 when the application-set 224, the download-set 226, or a combination thereof includes multiple instances of content therein corresponding to a portion of the operational order 206.

The recommendation module 528 can determine the application suggestion 228, the download suggestion 230, or a combination thereof by selecting the corresponding instance of the applications 210 having the highest score or ranking. For example, the recommendation module 528 can select the application that performs the most instances of the intermediate items 207 as required by the user-initiated action 204 among other available applications from the application suggestion 228 or the download suggestion 230. Also for example, the recommendation module 528 can select the application most often used or highest rated by other users having similar profiles as the user.

The recommendation module 528 can also determine whether to present the download suggestion 230 to the user. For example, the recommendation module 528 can have guidelines to only display the download suggestion 230 when the application-set 224 includes no instance of the applications 210 for performing a portion of the user-initiated action 204. Also for example, the recommendation module 528 can have rules to inform the user of the download suggestion 230 when the overlapping application has not been used often, inappropriate for the context 208, has been scored or rated lower than a predetermined amount compared to the download suggestion 230, or a combination thereof.

For further example, the recommendation module 528 can search various ratings and usage status of the overlapping application using the user profile 302, such as frequently visited blogs or the external profile 304 of other users having similar profiles or usage patterns. The recommendation module 528 can include a new or recently updated instance of the applications 210 in the download suggestion 230 when the search returns at least a predetermined amount of score or favorable mentions.

The recommendation module 528 can be connected to the application-ordering module 530. The recommendation module 528 can pass the application suggestion 228, the download suggestion 230, or a combination thereof as an input to the application-ordering module 530. The recommendation module 528 can also pass the pointer or the address to the application suggestion 228, the download suggestion 230, or a combination thereof to the application-ordering module 530.

The application-ordering module 530 is configured to sequence the applications 210 according to the operational order 206. The application-ordering module 530 can sequence the applications by generating the application order 232 based on the operational order 206. The application order 232 can be used for implementing the applications 210, including the execution file 212 and the further executable file 214, to perform the user-initiated action 204, the performance of which can be displayed on the first device 102.

The application-ordering module 530 can generate the application order 232 by using the first control unit 412, the second control unit 434, or a combination thereof to match instances of the applications 210 determined by the recommendation module 528 to the intermediate items 207 in the operational order 206. The application-ordering module 530 can search the title 216, the description 218, the input 220 of FIG. 2, the output 222 of FIG. 2, or a combination thereof for the applications 210 for keywords, types, categories, values, or a combination thereof matching or associated with individual instances of the intermediate items 207 in the operational order 206.

For example, the applications 210 having words associated with locations, such as hotels or airport, in the title 216 or the description 218 can be associated with "where", "determine destination", "stay", or a combination thereof. Also for example, the applications 210 having flight or hotel reservation confirmation can be associated with "where", "determine destination", "stay", or a combination thereof.

As a more specific example, the recommendation module 528 can determine the execution file 212 for satisfying "who", "when", "route" and "stay" as identified in the operational order 206 corresponding to the user-initiated action 204 of making reservations for the context 208 of a business trip. The recommendation module 528 can determine the further executable file 214 for satisfying "dining recommendations" from social media connections.

The application-ordering module 530 can generate the application order 232 sequencing the applications 210 according to the operational order 206. Continuing with the example, the application-ordering module 530 can generate the application order 232 by designating the execution file 212 to be initiated before the further executable file 214. The application-ordering module 530 can generate the application order 232 by sequentially ordering the title 216, the address, the pointer, or a combination thereof for the execution file 212 before that of the further executable file 214.

The application-ordering module 530 can generate the application order 232 based on the user profile 302. The application order 232 can be generated by using the application suggestion 228, the download suggestion 230, or a combination thereof determined using the user profile 302 to generate the application order 232.

The application-ordering module 530 can further generate the application order 232 by adjust the initial instance of the application order 232 based on the user profile 302. Continuing with the example, the usage history 312, the recent access set 314, or a combination thereof can indicate that the user has used the further executable file 214 before the execution file 212 for matching or related instances of the user-initiated action 204, the context 208, or a combination thereof. Based on past usage or personal preference of the user, the application-ordering module 530 can adjust the application order 232 to have the further executable file 214 initiate before the execution file 212.

The application-ordering module 530 can generate the application order 232 based on the download suggestion 230. The application-ordering module 530 can include the download suggestion 230 in the application order 232.

The application-ordering module 530 can include the download suggestion 230 when no application exists in the application-set 224 for performing a portion of the user-initiated action 204 as indicated by the recommendation module 528. The application-ordering module 530 can also include the download suggestion 230 when a downloadable application has a score or rating exceeding that of the applications 210 in the application-set 224 by at least the threshold amount as indicated by the recommendation module 528.

The application-ordering module 530 can require the user to initiate or approve downloading the download suggestion 230. For example, the application-ordering module 530 can notify the user of the download suggestion using the first user interface 418. The application-ordering module 530 can include the download suggestion 230 in the application order 232 when the user initiates or approves downloading the download suggestion 230.

The application-ordering module 530 can further generate the application order 232 for accessing the access points 518 of the applications 210 in the application order 232. The application-ordering module 530 can generate the application order 232 for accessing the access points 518 by overlapping the processing of multiple instances of the applications 210.

For example, the application-ordering module 530 can generate the application order 232 to have the execution file 212 initiate first and have the further executable file 214 initiate when the execution file 212 reaches its first instance of the access points 518. Also for example, the application-ordering module 530 can generate the application order 232 to have the execution file 212 and the further executable file 214 initiate at the same time but also to control the order in which the user can access or interact with the applications 210. The application order 232 can designate the further executable file 214 to be hidden or have the user interface portion disabled until the user starts interacting with the execution file 212 first.

The application-ordering module 530 can generate the application order 232 to control parallel processing. The application-ordering module 530 can generate the application order 232 to dictate that different instances of the applications 210 are process by different processors. For example, the application-ordering module 530 can generate the application order 232 to process the execution file 212 with the first control unit 412 and the further executable file 214 with the second control unit 434. Also for example, the application order 232 can dictate that the first control unit 412 use different portions therein, such as different processors or cores, to process the execution file 212 and the further executable file 214.

The application-ordering module 530 can further generate the application order 232 to link the input 220 and the output 222 of the applications 210. The application-ordering module 530 can generate the application order 232 to have certain instance of the output 222 of preceding application as certain instance the input 220 of the following application.

For example, the application order 232 can designate the time and date of arrival on the flight reservation confirmation resulting from the execution file 212 as the input 220 for check in date for the further executable file 214 that reserves hotel rooms. Also for example, the application order 232 can designate the output 222 of store contact information, such as the address or phone number, as the input for the following applications, such as phone applications or navigation applications.

The application-ordering module 530 can further generate the application order 232 to link the input 220 of the applications 210. The application-ordering module 530 can have the application order 232 designate storage of the input 220 at any of the access points 518 in processing the user-initiated action 204. The application order 232 can use the stored input or any information from the user profile 302, such as user's personal or contact information, where overlaps occur within other applications in the application order 232.

It has been discovered that the application order 232 has been discovered to provide increased efficiency and accuracy for the computing system 100. The application order 232 provides the increased efficiency by managing available resources for performing the user-initiated action 204 and enabling parallel processing. The application order 232 provides increase in efficiency and accuracy also by linking the input 220 and the output 222 between applications to eliminate retyping of the same information, which can be a source of user error.

It has also been discovered that the application order 232, the operational order 206, and the context 208 provide user-friendly interaction for the computing system 100. The application order 232, the operational order 206, and the context 208 provide user-friendly interaction by modeling a logical order of performing the user-initiated action 204, appropriate for the context 208, through the use of the applications 210.

Moreover, it has been discovered that the application order 232 and the download suggestion 230 maximize the functionality of the computing system 100. The application order 232 and the download suggestion 230 maximize the functionality by enabling the user to fully utilize the appropriate applications from many possible applications, including applications unknown to the user.

The application order 232, the operational order 206, or a combination thereof can be hidden to the user. The computing system 100 can implement the applications 210 according to the application order 232 based on the operational order 206 with the contents of the application order 232, the operational order 206, or a combination thereof being unknown to the user. The user interaction can be stored in the user profile 302 to improve subsequent determinations of application order 232, the operational order 206, or a combination thereof without disclosing the contents therein.

The related-activity module 532 is configured to determine the context-based suggestion 310 of FIG. 3 associated with the user-initiated action 204 based on the context 208. The related-activity module 532 can determine the context-based suggestion 310 based on the user profile 302. For example, if user has initiated a different activity, application, task, context, or a combination thereof following the same or similar instance of the user-initiated action 204, the context 208, the applications 210, or a combination thereof as the currently used one, the related-activity module 532 can set the previously following different activity, application, task, context, or a combination thereof as the context-based suggestion 310.

The related-activity module 532 can also determine the context-based suggestion 310 by comparing keywords or categories between the user-initiated action 204 and the context 208. The related-activity module 532 can set the context-based suggestion 310 as the keywords or categories of the context 208 not covered by the user-initiated action 204. For example, if the context 208 includes "business trip" with "supervisor" and the user-initiated action 204 does not cover the "supervisor" portion of the context 208, the context-based suggestion 310 can be "supervisor" for further instances of the user-initiated action 204 associated with "supervisor".

The order adjustment module 538 is configured to adjust the application order 232 to include the context-based suggestion 310. The order adjustment module 538 can adjust the application order 232 to include additional applications, remove appropriate applications, rearrange the sequencing of applications, or a combination thereof to have the application order 232 include the context-based suggestion 310. The process for adjusting the application order 232 can be similar to the process of the application-ordering module 530 described above.

It has been discovered that the context-based suggestion 310 provides contextually appropriate functionalities to the user. The context-based suggestion 310 can provide contextually appropriate functionalities by ensuring the context 208 is fully covered by the user.

After determining the order for operating the applications 210, information regarding any downloaded applications can be passed to the profile module 502 for updating the application-set 224, and the control flow can pass to the task execution module 508. The task execution module 508 is configured to perform the user-initiated action 204 using the applications 210 according to the application order 232. The task execution module 508 can have a preload module 540.

The preload module 540 is configured to preload the applications 210 to perform the user-initiated action 204. For example, the preload module 540 can preload the execution file 212, the further executable file 214, or a combination thereof according to the application order 232 for performing the user-initiated action 204.

The preload module 540 can preload the applications 210 by storing instructions, input data, computational results, addresses, formats, or a combination thereof associated with the applications 210 from slower and more permanent memory to a faster or easily accessible memory. For example, the computing system 100 can transfer necessary information from a hard drive or an external storage only device to random access memory, cache memory, pre cache memory, secure digital card, or a combination thereof.

The preload module 540 can also preload the applications 210 by initiating the applications 210 autonomously without the user input or interaction. The preload module 540 can initiate the applications 210 and implement the processing up to the access points 518 therein. The preload module 540 can also follow the application order 232 to set the input 220 at the access points 518.

For example, the preload module 540 can set the input 220 of the further executable file 214 equal to the output 222 of the execution file 212 that precedes the further executable file 214. The preload module 540 can process the further executable file 214 with the input 220 until next appropriate instance of the access points 518. Also for example, preload module 540 can set the input 220 for the further executable file 214 based on the input 220 of the execution file 212.

The preload module 540 can further preload the applications 210 by overlapping the processing of the applications 210. For example, the preload module 540 can follow the application order 232 to preload the execution file 212, the further executable file 214 or a combination thereof during execution of the execution file 212, the further executable file 214 or a combination thereof for overlapping the execution file 212 and the further executable file 214.

Continuing with the example, the preload module 540 can store the further executable file 214 into faster memory or perform parallel processing and execute instructions in the further executable file 214 while executing the execution file 212. The preload module 540 can also preload the execution file 212 while executing the further executable file 214.

The preload module 540 can display the progress or status of the process of preloading the applications 210. The preload module 540 can use the first user interface 418 to display the pre-loading status 326 of FIG. 3.

The usage and access information of the applications can be passed to the profile module 502 for updating the usage history 312, the recent access set 314, the elapsed time 318, or a combination thereof. The task execution module 508 can pass the control flow to the profile module 502 once the user-initiated action 204 is complete.

It has been discovered that the preload module 540 preloading the applications 210 according to the application order 232 provides improved efficiency and accuracy for the computing system 100 in performing the user-initiated action 204. The preload module 540 preloading the applications 210 according to the application order 232 provides improved efficiency by enabling parallel processing and reducing wait time for the user to access different applications. The computing system 100 further provides efficiency and accuracy by eliminating redundant input of information, which can be a source for user error.

The computing system 100 has been described with module functions or order as an example. The computing system 100 can partition the modules differently or order the modules differently. For example, the record module 512 and the timer module 514 can be combined into one module or the functionalities of the task-identification module 520 and the context-determination module 522 can be combined. Also for example, the download-set 226 can be determined after determining the user-initiated action 204, the context 208, the operational order 206, or a combination thereof.

The modules described in this application can be hardware implementation or hardware accelerators in the first control unit 416 of FIG. 4 or in the second control unit 438 of FIG. 4. The modules can also be hardware implementation or hardware accelerators within the first device 102 or the second device 106 but outside of the first control unit 416 or the second control unit 438, respectively.

The physical transformation from the operational order 206 to the application order 232 results in the movement in the physical world, such as user interfacing with the applications 210 to perform the user-initiated action 204. Movement in the physical world results in changes to the user-initiated action 204 and the context 208 for determining the application order 232 by storing and using the input 220 for the applications 210 in the user profile 302 to further refine the accuracy of the user-initiated action 204 and the context 208.

Figure 6:
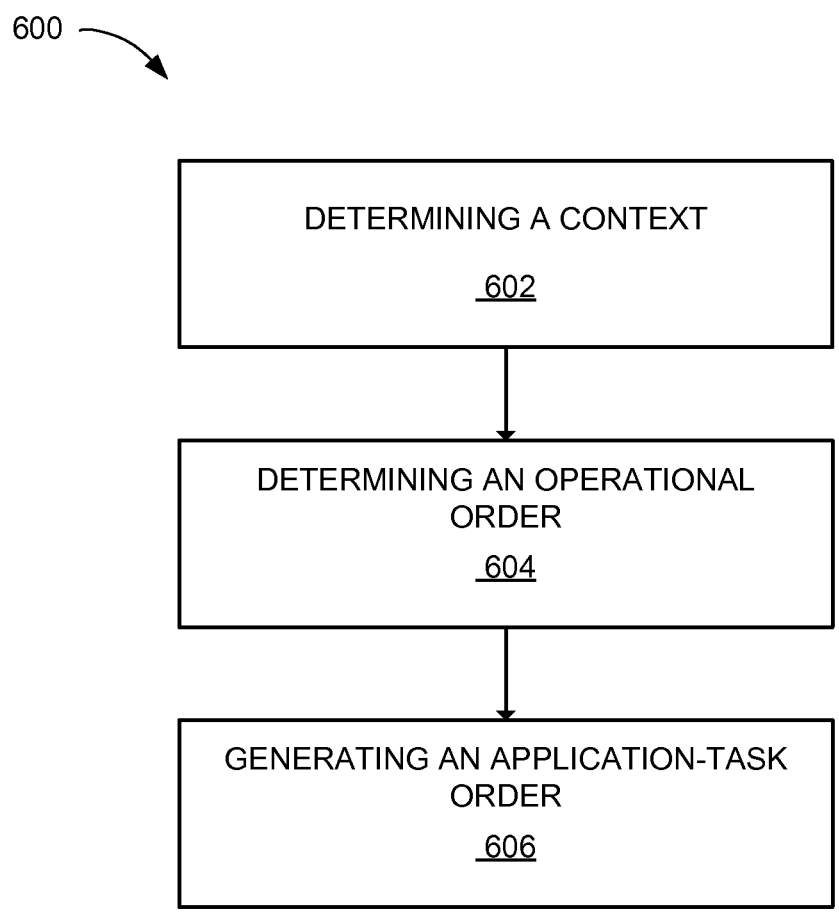
FIG. 6 is a flow chart of a method of operation of a computing system in a further embodiment of the present invention.

Referring now to FIG. 6, therein is shown a flow chart of a method 500 of operation of a computing system 100 in a further embodiment of the present invention. The method 500 includes: determining a context for performing a task in a block 602; determining an operational order based on the context for performing the task in a block 604; and generating an application order based on the operational order for implementing an execution file and a further executable file according to the application order to perform the task through displaying on a device in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance.

These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a computing system comprising:
   determining a user profile;
   dynamically determining a current context based on the user profile with a control unit for performing a user-initiated action;
   determining an operational order in response to the current context for sequencing intermediate items, including an action or task, to complete the user-initiated action;
   determining an application suggestion by ranking an application to perform the action or the task of the intermediate items, wherein the ranking for the application is based on a number of instances of the intermediate items the application can perform;

generating an application order based on the operational order, the application order for sequencing execution of an execution file and a further executable file according to the application order to perform the user-initiated action, wherein generating the application order is further based on an application-set and a download-set which respectively include multiple instances of applications corresponding to a portion of the operational order and the application ranking; and preloading the execution file, the further executable file or a combination thereof according to the application order for performing the user-initiated action on a device.

2. The method as claimed in claim 1 wherein: further comprising"
generating the application order includes generating the application order based on the user profile.

3. The method as claimed in claim 1 wherein generating the application order includes:
determining a download suggestion from the download-set, the download suggestion matching the portion of the operational order; and
generating the application order based on the download suggestion.

4. The method as claimed in claim 1 further comprising:
determining a context-based suggestion associated with the user-initiated action based on the current context; and
adjusting the application order to include the context-based suggestion.

5. The method as claimed in claim 1 wherein preloading includes preloading the execution file, the further executable file or the combination thereof during execution of the execution file, the further executable file or the combination thereof for overlapping the execution file and the further executable file.

6. The method as claimed in claim 1 wherein preloading includes setting an input of the further executable file equal to an output of the execution file.

7. The method as claimed in claim 1 wherein:
generating the application order includes generating the application order for accessing access points of the execution file, the further executable file, or the combination thereof;
preloading includes preloading the execution file, the further executable file, or the combination thereof up to the access points.

8. A computing system comprising:
a control unit, including a processor, configured to:
determine a user profile;
dynamically determine a current context based on the user profile for performing a user-initiated action;
determine an operational order in response to the current context for sequencing intermediate items, including an action or task, to complete the user-initiated action;
determine an application suggestion by ranking an application to perform the action or the task of the intermediate items, wherein the ranking for the application is based on a number of instances of the intermediate items the application can perform;
generate an application order based on the operational order, the application order configured to sequence execution of an execution file and a further executable file according to the application order to perform the user initiated action, wherein the application order is further based on an application-set and a download-set which respectively include multiple instances of applications corresponding to a portion of the operational order and the application ranking;
preload the execution file, the further executable file or a combination thereof according to the application order for performing the user-initiated action on a device; and
a user interface, coupled to the control unit, configured to communicate performance of the user-initiated action for interacting with a user.

9. The system as claimed in claim 8 wherein the control unit is configured to:
generate the application order based on the user profile.

10. The system as claimed in claim 8 wherein the control unit is configured to:
determine a download suggestion from the download-set, the download suggestion matching the portion of the operational order; and
generate the application order based on the download suggestion.

11. The system as claimed in claim 8 wherein the control unit is configured to:
determine a context-based suggestion associated with the user-initiated action based on the current context; and
adjust the application order to include the context-based suggestion.

12. The system as claimed in claim 8 wherein the control unit is configured to preload the execution file, the further executable file or the combination thereof during execution of the execution file, the further executable file or the combination thereof for overlapping the execution file and the further executable file.

13. The system as claimed in claim 8 wherein the control unit is configured to set an input of the further executable file equal to an output of the execution file.

14. The system as claimed in claim 8 wherein the control unit is configured to:
generate the application order for accessing access points of the execution file, the further executable file, or the combination thereof; and
preload the execution file, the further executable file, or the combination thereof up to the access points.

* * * * *